Oct. 20, 1964  E. PLUMAT  3,153,583
APPARATUS FOR VERTICALLY DRAWING GLASS IN SHEET
FORM FROM A BODY OF MOLTEN GLASS
Filed Jan. 10, 1961
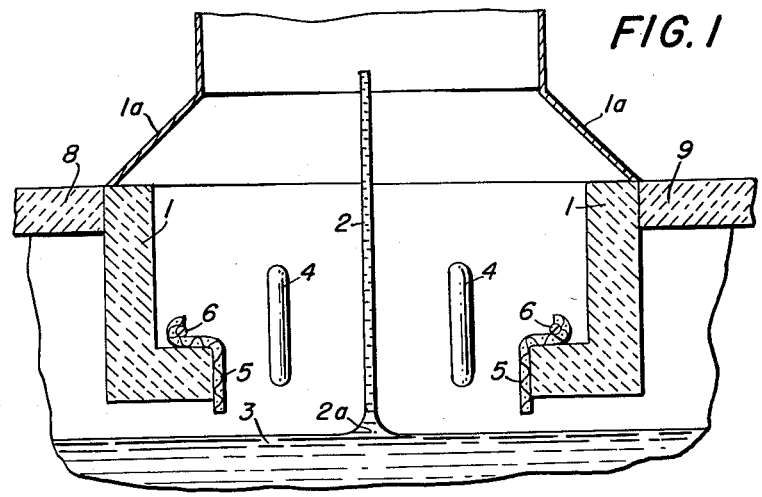
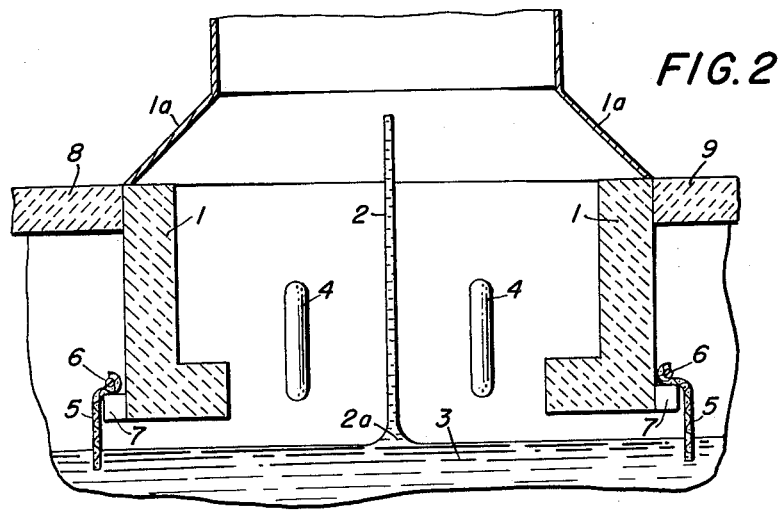
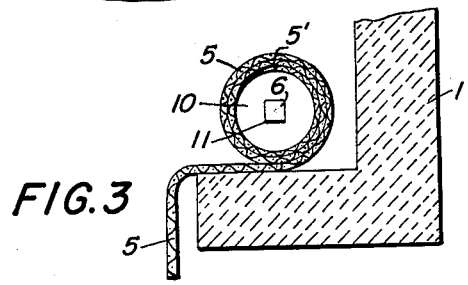
INVENTOR
EMILE PLUMAT
BY *Cory, Hart & Stemple*
ATTORNEYS United States Patent Office 3,153,583
Patented Oct. 20, 1964

3,153,583
APPARATUS FOR VERTICALLY DRAWING GLASS IN SHEET FORM FROM A BODY OF MOLTEN GLASS
Emile Plumat, Gilly, Belgium, assignor to Union des Verreries Mecaniques Belges, Societe Anonyme, Charleroi, Belgium, a company of Belgium
Filed Jan. 10, 1961, Ser. No. 81,741
Claims priority, application Belgium Jan. 19, 1960
5 Claims. (Cl. 65—204)

This invention relates to apparatus for vertically drawing glass in sheet form from a body of molten glass.

Many attempts have been made to prevent local temperature differences in the region where the sheet is being formed by setting up a prescribed circulation within the drawing chamber within which the glass is drawn to eliminate adverse effects of cold air currents entering through the side walls of the drawing chamber (i.e., through walls at right angles to the sheet being drawn) and also many proposals have been made in attempts to safeguard against cold air currents, originating about the coolers near the meniscus between which coolers the sheet is drawn, from moving towards the sheet of glass in the region where it is being formed. It has also been proposed both to prevent a cold boundary layer, formed about the coolers, from falling towards the meniscus, and to prevent the formation of such a boundary layer. All such efforts have been directed to preventing local temperature differences in the region where the sheet is being formed, with a view to eliminating distortion in the drawn sheet.

However it is also well known that currents of cold air enter into the headspace over the body of molten glass between the usual roof elements which cover the extension to a glass melting tank, from which extension the glass is drawn between the end wall of the extension and the front wall of the drawing chamber and between the rear wall of the drawing chamber and the roof structure of the glass melting tank, the latter roof elements including a tweel the function of which is to shut off furnace gases from the drawing chamber which is capable of being raised or lowered through the roof elements. The tweel is usually associated with a skim bar and therefore more or less shuts off the headspace between the melting furnace and the drawing chamber, but such elements disintegrate and contaminate the body of molten glass.

However in practice some air currents percolate into the headspace through the roof structure over the bath and, then are rapidly drawn, with any furnace gases seeping by the tweel, along the surface of the molten glass towards the line of draw when a negative pressure exists, and these conditions are aggravated when an annealing tower is superimposed on the drawing chamber, as in the well knonw Pittsburgh process, the arrangement engendering what is generally known as a chimney effect.

The main object of the present invention is to prevent interference with any intended circulation set up within the chamber or any measure taken to prevent the impact of cold air emanating from the coolers from reaching the region where the sheet is being formed and at the same time prevent impairment of the surfaces of the sheet being drawn, either by thermal action or by chemical action or by both, arising from the arrival of gaseous streams originating in the headspace between the surface of the molten body of glass and the roof elements which cover the extension to a glass melting tank, which extension confines the body of molten glass.

Apparatus for vertically drawing glass in sheet form from a body of molten glass comprising a drawing chamber erected over the tank extension containing the body of molten glass, means for drawing the glass upwardly into the chamber and roof elements over the extension and adjoining the drawing chamber according to the present invention is characterised in that a screen is hung from each foot of the chamber, transversely of the direction of flow at the surface of the body of molten glass which flow is engendered chiefly by removal of glass due to formation of the sheet and is constructed to intercept the flow of gaseous currents between the respective foot of the chamber and the surface of the body of molten glass and in the direction towards the line of draw.

The apparatus constructed according to the invention may comprise screens fixed to rods which latter are operable to roll the screen on or from the respective rods.

The invention may advantageously be embodied in sheet drawing apparatus of the Pittsburgh type and in such cases the foot of the drawing chamber is constituted by L-blocks and the screens may be hung from shoulders formed on the L-blocks. In all constructions according to the present invention the screens may be composed of a refractory material such as glass fibres rich in silica or in silico-alumina and capable of withstanding without deterioration a temperature of at least 1,000° C.

The glass fibres from which the screens are formed may be coated, or the screens as a whole coated, with a metal or alloy resistant to the molten glass at the operating temperature. Examples of suitable metals for coating the fibres or covering the screens are gold, platinum and refractory steels.

Alternatively the screens may be composed of strands of a metal or alloy resistant to molten glass at the operating temperature and in either case the fibres or screens are preferably woven in a manner to make the screens impervious to the gases in the headspace over the body of molten metal.

When operating the rollable screens they may be lowered so as to intercept the surface of the molten body of glass to a predetermined degree in order to prescribe to some extent the level from which is drawn the main body of glass moving to the line of draw. Where screens are formed of metal strands, or indeed when metallised, they may be employed to constitute electrodes of an electric heating current which passes through the molten body of glass either between the two screens at the foot of the drawing chamber or between the screens, and electrodes placed at suitable points in the vicinity of the line of draw.

Although the invention has been described with regard to the application of screens to the L-blocks of a drawing chamber operated on the Pittsburgh system, clearly in accordance with the invention screens may be embodied in the other well known types of apparatus for drawing sheets vertically from a molten body of glass, namely the Fourcault process in which the sheet is drawn from glass forced through a slot in the floor of a debiteuse under a hydrostatic head, and the Colburn process. The Pittsburgh process differs from the Colburn process amongst other things by the employment in the Pittsburgh process of a draw bar which is submerged in the molten glass below the line of draw to stabilise the position of the meniscus.

In order that the invention may be more clearly understood reference will now be made by way of example to the accompanying diagrammatic drawings which show two embodiments of the present invention in a Pittsburgh type of sheet drawing apparatus.

In the drawings FIGURES 1 and 2 show in diagrammatic sectional elevation a drawing chamber with screens mounted on L-blocks of the drawing chamber to intercept gaseous flow between the L-blocks and the surface of the molten glass from which the sheet is drawn, whereas FIGURE 3 shows an example of a constructional detail.

In the drawings like references designate similar parts.

Referring to the drawings:

As well understood in the art of vertically drawing glass in sheet form in Pittsburgh type of apparatus, L-blocks 1 between which the sheet is vertically drawn constitute the foot of the drawing chamber, the lower part of which latter is indicated at 1a. As the sheet is formed at the meniscus 2a it is drawn upwardly from the body of molten glass 3 as it passes between coolers 4 arranged in effective relation with the sheet 2 to ensure the desired cooling of the sheet by radiation.

The usual refractory draw bar, immersed in the body of molten glass below the line of draw in a Pittsburgh drawing apparatus, is omitted from the accompanying diagrams for the sake of clarity in describing the present invention, the function of which bar is, as is well known, to stabilise the line of draw and to assist in regulating the viscosity of the glass reaching the sheet being drawn up into the drawing chamber.

The screens employed in apparatus according to the invention are indicated at 5 as hanging from rods 6 mounted at the foot of the drawing chamber, by being carried either on the inward horizontal limbs of the L-blocks, as shown in FIGURE 1, or on shoulders 7 formed on the outer walls of the L-blocks, as shown in FIGURE 2.

The screens are fixed to the rods and the rods mounted to be operable to roll on the screens of their respective rods or unroll them therefrom. In FIGURE 1 the substantially deformable screens are shown partly unrolled and in FIGURE 2 they are shown unrolled to an extent to intersect the surface of the molten body of glass 3. Thus the screen mountings permit of easy regulation of the height of the screens, and thus the extent of immersion, so that the glass moving towards the line of draw to form the two faces of the sheet 2 can be taken, by operating the rods 6, from the layer of glass in the bath having the viscosity required to maintain matching viscosity on each side of the line of draw.

In the drawings the roof element 8 is a usual front element which covers the molten body 3 between the front wall of the drawing chamber i.e. the wall 1a facing the sheet 2 and the end wall (not shown) of the extension of the glass melting tank, which extension confines the molten body from which the sheet 2 is drawn. Between the front roof element 8 and the end wall of the drawing chamber, and between the roof element 8 and the end wall of the extension draughts of cold air enter into the headspace under the roof element 8. The roof element 9 is the usual curtain element located between the rear wall of the drawing chamber (i.e., the other wall 1a facing the sheet 2) and the usual cut-off tweel. Such roof structure is well known and is exemplified in FIGURE 1 of the specification of United Kingdom Patent No. 850,463. Draughts of cold air enter into the headspace on each side of the cut off tweel, that is to say between the cut off tweel and the ends of the adjacent roof elements and also draughts occur between the curtain element and the rear wall of the drawing chamber. The screens 5 employed in constructions according to the invention prevent cold air entering the headspaces from flowing under the L-blocks towards the line of draw.

In operating apparatus constructed according to the present invention the rods 6 can be operated so that the screens 5 are lowered to completely shut off the drawing chamber from the headspace outside the screens, that is to say, the headspace between the roof structure and the surface of the body of molten glass, whereby any harmful gaseous currents developed in the headspace are prevented from reaching the meniscus 2a. Thus any precautions taken to prescribe convection currents within the drawing chamber, or to prevent cold air moving from the coolers 4 towards the glass in the region where the sheet is being formed, are wholly undisturbed and the intended control of circulation in the drawing chamber preserved.

Preferably the screens are made of fibres formed from a glass rich in silica or silico-alumina capable of withstanding without deterioration the temperature conditions over the molten bath where, generally speaking, the temperature is higher than 1,000° C. Where, however, it is desired to electrically control the temperature of the glass in the molten body 3 below the line of draw, the screens may be metallised, as already explained, or may be formed of strands of metal, preferably woven together so as to be impervious to percolation by gases in the headspace, and such screens may be used as electrical conductors in an electrical system, capable of controlling the temperature below the line of draw, that is to say, the screens 5 may in such cases constitute electrodes between which electrical energy flows, or electrodes may be disposed between the screens.

According to the example shown in FIGURE 3, one end, 5' of each screen 5 is attached to a roller 10 provided with an axial bore 11, for instance of square cross section, through which an operating rod 6, of corresponding cross section, is passed from the outside of the tank, for instance through cooled bearings (not shown) located in the corresponding side walls of the tank, said rod 6 being rotatable in said bearings and operable for instance by means of a crank handle (not shown).

From the foregoing it will be appreciated that in the construction described, the screens 5 physically isolate the drawing chamber from the headspace over the body of molten metal, thus contributing to the elimination of local temperature differences in the glass in the region where the sheet is being formed, and at the same time they may be utilised as part of an electrical system controlling the temperature of the molten glass below the drawing chamber.

I claim:

1. Apparatus for vertically drawing sheet glass from a body of molten glass comprising a drawing chamber formed over and extension from a glass melting tank and having spaced apart footings located in opposite sides of the glass sheet being drawn and extending downwardly to points adjacently above the surface of the molten glass so as to afford therebelow gas passages between such chamber and spaced headspaces on the other sides of said footings, said footings having shoulders disposed in substantial parallelism to the glass sheet and spaced above the lower ends of such footings, screen supporting means mounted on said shoulders and deformable screens extending from said supporting means to the outer edges of said shoulders and depending downwardly from such shoulder edges toward the molten glass to block the gas passages below said footings, the supporting means associated with each screen including a rod on which the screen is rolled and which is operable to regulate the length of the depending portion of such screen, each of said screens being constituted of material capable of withstanding temperatures above 100° C. and fabricated to make such screens impervious to gas flow and to enable such screens to prevent the passage therethrough of gaseous currents tending to flow from the headspaces and through the passages afforded below said footings towards the line of draw of the glass sheet.

2. Apparatus for vertically drawing sheet glass from a body of molten glass comprising a drawing chamber formed over and extension from a glass melting tank and having spaced apart footings located on opposite sides of and in substantial parallelism with the glass sheet being drawn and extending downwardly to points adjacently above the surface of the molten glass so as to afford therebelow gas passages between such chamber and spaced apart headspaces on the other sides of said footings, said footings having shoulders disposed in substantial parallelism to the glass sheet and spaced above the lower ends of such footings, screens extending downwardly in depending relation from the outer edges of said shoulders toward the molten glass to block the gas passages below said footings, each of said screens being constituted of deformable material capable of withstanding temperatures above 1000° C. and fabricated to make such screens impervious to gas flow and to enable such screens to prevent the passage therethrough of gaseous currents tending to flow from the headspaces and through the passages afforded below said footings towards the line of draw of the glass sheet, a cooling unit located on each side of the glass sheet and between such sheet and one of said screens, said cooling units extending down in said drawing chamber to points below said shoulders, and means supporting said screens so that intermediate portions thereof rest on said outer edges of said shoulders thereby enabling said screens to effectively block the passage of said gaseous currents to said cooling units and glass sheet throughout the vertical areas through which such screens depend, said supporting means including rods on which said screens are rolled and which are operable to regulate the lengths of the depending portions of said screens.

3. Apparatus for vertically drawing sheet glass from a body of molten glass comprising a drawing chamber formed over and extension from a glass melting tank and having spaced apart footings located in opposite sides of and in substantial parallelism with the glass sheet being drawn and extending downwardly to points adjacently above the surface of the molten glass so as to afford therebelow gas passages between such chamber and spaced apart headspaces on the other sides of said footings, said footings having shoulders disposed in substantial parallelism to the glass sheet and spaced above the lower ends of such footings, an adjustable roll of screen material overlying the shoulder of each footing and being unwound so that the screen material extends to the outer edge of such shoulder to rest thereon and then depends downwardly vertically from such outer edge toward the molten glass to block the gas passage below its associated footing, each of said rolls of screens including a rod on which the screen material is wound and which is operable to regulate the length of the depending portion of the screen, the screen material in each of said rolls being deformable and capable of withstanding temperatures above 1000° C. and fabricated to make the screens impervious to gas flow and to enable such screens to prevent the passage therethrough of gaseous currents tending to flow from the headspaces and through the passages afforded below said footings towards the line of draw of the glass sheet, said screens by reason of their overlying engagement with the outer edges of said shoulders effectively blocking the passage of said gaseous currents throughout the vertical areas through which such screens depend.

4. Apparatus for vertically drawing sheet glass from a body of molten glass comprising a drawing chamber formed over and extension from a glass melting tank and having spaced apart footings located on opposite sides of and in substantial parallelism with the glass sheet being drawn and extending downwardly to points adjacently above the surface of the molten glass so as to afford therebelow gas passages between such chamber and spaced apart headspaces on the other sides of said footings, said footings having shoulders disposed in substantial parallelism to the glass sheet and spaced above the lower ends of such footings, an adjustable roll of screen material overlying the shoulder of each footing and being unwound so that the screen material extends to the outer edge of such shoulder to rest thereon and then depends downwardly vertically from such outer edge to extend down to block the gas passage below its associated footing, the extent of immersion of each of said screens being such that the lower end thereof is located at a given level below the surface of the glass body at which the glass has a viscosity required to maintain matching viscosity on each side of the line of draw for the glass sheet, each of said rolls of screens including a rod on which the screen material is wound and which is operable to regulate the length of the depending portion of the screen, the screen material in each of said rolls being deformable and capable of withstanding temperatures above 1000° C. and fabricated to make the screens impervious to gas flow and to enable such screens to prevent the passage therethrough of gaseous currents tending to flow from the headspaces and through the passages afforded below said footings towards the line of draw of the glass sheet, said screens by reason of their overlying engagement with the outer edges of said shoulders effectively blocking the passage of said gaseous currents through the vertical areas through which such screens depend.

5. Apparatus such as defined in claim 4 in which said screen material is composed of metal contained in the fabric thereof to enable said screens to be used as electrical conductors in an electrical system to control the temperature of the molten glass below the line of draw.

References Cited in the file of this patent
UNITED STATES PATENTS

| | | |
|---|---|---|
| 1,759,235 | Mambourg | May 20, 1930 |
| 2,015,773 | Watt | Oct. 1, 1935 |
| 2,991,590 | Brichard | July 11, 1961 |

UNITED STATES PATENT OFFICE
CERTIFICATE OF CORRECTION

Patent No. 3,153,583　　　　　　　　　　　October 20, 1964

Emile Plumat

It is hereby certified that error appears in the above numbered patent requiring correction and that the said Letters Patent should read as corrected below.

Column 1, line 53, for "knonw" read -- known --; column 4, lines 36 and 61, column 5, line 20, and column 6, line 3, for "and", each occurrence, read -- an --; column 4, lines 47 and 73, and column 5, line 34, strike out "toward the molten glass", each occurrence; column 4, line 53, for "$100°$ C." read -- $1000°$ C. --; column 5, line 21, for "in" read -- on --; column 6, line 36, for "through", first occurrence, read -- throughout --.

Signed and sealed this 15th day of June 1965.

(SEAL)
Attest:

ERNEST W. SWIDER
Attesting Officer

EDWARD J. BRENNER
Commissioner of Patents